United States Patent [19]

Pullen, Jr.

[11] Patent Number: 4,903,186

[45] Date of Patent: Feb. 20, 1990

[54] TRANSFORMER-RECTIFIER WITH RIPPLE FILTER

[76] Inventor: Keats A. Pullen, Jr., 2807 Jerusalem Rd., Kingsville, Md. 21087

[21] Appl. No.: 355,580

[22] Filed: May 22, 1989

[51] Int. Cl.$^4$ .............................................. H02M 1/14
[52] U.S. Cl. ...................................... 363/45; 363/61; 363/126
[58] Field of Search ........................................ 363/2–4, 363/44, 45, 47, 48, 61, 126

[56] References Cited

U.S. PATENT DOCUMENTS

| | | | |
|---|---|---|---|
| 3,088,066 | 4/1963 | Seeley | 363/4 |
| 3,258,673 | 6/1966 | Logan | 363/4 |
| 3,515,890 | 6/1970 | Kohashi et al. | 363/126 |

FOREIGN PATENT DOCUMENTS

| | | | |
|---|---|---|---|
| 1073619 | 1/1960 | Fed. Rep. of Germany | 363/126 |
| 493874 | 2/1976 | U.S.S.R. | 363/45 |
| 1072508 | 6/1967 | United Kingdom | 363/4 |

Primary Examiner—William H. Beha, Jr.
Attorney, Agent, or Firm—Saul Elbaum; Guy M. Miller

[57] ABSTRACT

A power supply having a low ripple component to minimize waste power and improve efficiency. In a full wave power supply, additional circuitry is provided for decreasing the time between charging episodes of the output capacitor. The circuitry is comprised of additional capacitors and diodes, and is connected between taps on the transformer and the output capacitor.

7 Claims, 1 Drawing Sheet

TRANSFORMER-RECTIFIER WITH RIPPLE FILTER

RIGHTS OF THE GOVERNMENT

The invention described herein may be manufactured, used and licensed by or for United States Government for Governmental purposes without payment to me of any royalty thereon.

The present invention is directed to a power supply which has a low ripple component.

A conventional half wave power supply operated off of a line at 60 Hz has a ripple component at 60 Hz, while a full wave power supply would have a ripple component at 120 Hz.

Since the ripple is normally dissipated as heat, it represents wasted power and hence it is desirable to minimize the magnitude of the ripple.

It is thus the object of the present invention to provide a more efficient power supply by minimizing the magnitude of the ripple component.

In accordance with the present invention, the magnitude of the ripple is decreased by decreasing the time interval between re-charging episodes of the output capacitor. Since the time interval is decreased, there is less variation in the voltage output of the capacitor.

This is accomplished by providing a full wave power supply using a center-tapped transformer which also has taps intermediate the center tap and the outer taps, wherein there is circuit means connected between the intermediate taps and the output capacitor for increasing the charging frequency of the capacitor. This circuit means connected between each of two intermediate taps and the output capacitor is comprised of a second capacitor and two diodes, and in operation the second capacitor which has previously stored charge, charges into the output capacitor at a predetermined point in the cycle, to increase the charging frequency thereof.

The exact location of the intermediate taps is set so as to cause re-charging of the output capacitor at the optimum points in the cycle.

The invention will be better understood by referring to the accompanying drawings, in which.

Figure 1:
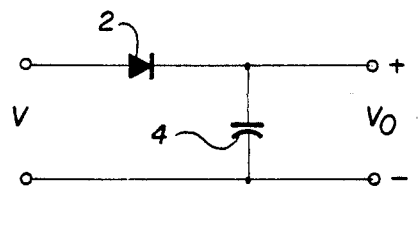
FIG. 1 is a schematic diagram of a half wave power supply.
Figure 2:
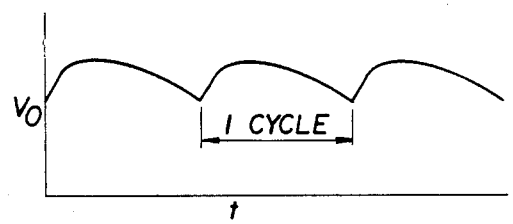
FIG. 2 is a representation of the output of the power supply of FIG. 1, showing the ripple component thereof.

Referring to FIG. 1, a conventional half wave power supply comprised of diode 2 and filter capacitor 4 is shown. If the input voltage V is at 60 Hz, the output voltage will have a ripple component at 60 Hz, and this is shown in FIG. 2.

Figure 3:
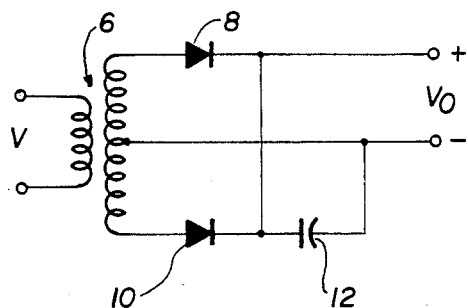
FIG. 3 is a schematic diagram of a full wave power supply.
Figure 4:
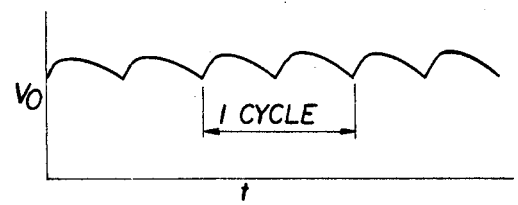
FIG. 4 is a representation of the output of the power supply of FIG. 3, showing the ripple component thereof.

Referring to FIG. 3, a full wave power supply comprised of transformer 6, diodes 8 and 10, and filter capacitor 12 is show. This supply will result in an output ripple at 120 Hz, and this is shown in FIG. 4.

The magnitude of the ripple, or variation of output voltage, is dependent on the period between re-charging of the filter capacitor, the magnitude of the current load, and the size of the capacitor.

The ripple is normally the element that determines the waste power and the heat that is dissipated in the power supply, as the ripple may be as much as twice or more times the sum of the supply voltage variation and the voltage difference between the minimum supply output and the voltage output of the following regulator.

The amount of charge that must be stored to maintain the output voltage under load is proportional to the time interval between charges, and the peak charging current must be sufficient to store the required total amount of charge.

For any given load, therefore, it is desirable to minimize the time interval between recharge episodes, as the charging pulses are required to provide the charge and the capacitors to store it for withdrawal by the load. The power dissipated in a power supply while delivering a regulated output can be minimized by shortening the time interval.

In accordance with the invention, a circuit is provided which uses a transformer having additional taps (total 5) and having two additional capacitors and additional diodes. This circuit can in effect cut the charging time interval in half, double the number of required recharges per cycle compared to a full-wave rectifier, and halve the charge required per pulse, leading to substantial improvement of power supply efficiency. The transformer has outer taps, a center tap, and intermediate taps between the center tap and the outer taps, the intermediate tap positions being adjusted to minimize the overall ripple.

Figure 5:
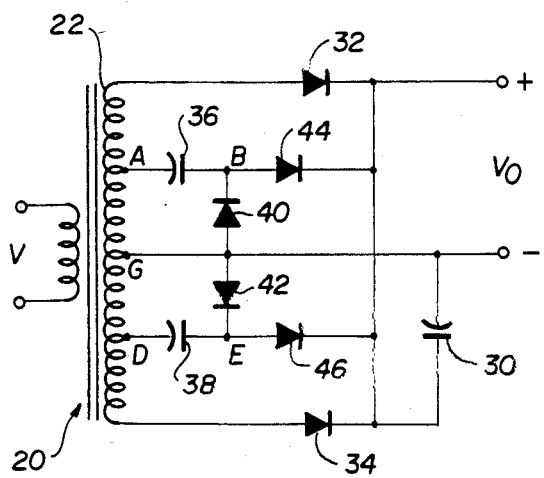
FIG. 5 is a schematic diagram of the power supply of the present invention.

The circuit, which is shown in FIG. 5, uses transformer 20 having secondary 22, which is center-tapped at reference letter G. Additionally, each half of the transformer has an intermediate tap, and these are shown by reference letters A and D. The exact positions of the intermediate taps are adjusted to cause recharging of the output capacitor midway between conduction of the two rectifier diodes.

In addition to the transformer, the circuit is comprised of rectifier diodes 32 and 34, output capacitor 30, additional capacitors 36 and 38, and additional diodes 40, 42, 44 and 46.

In the operation of the circuit, diode 40 conducts when rectifier 34 conducts, recharging capacitor 36. Diode 42 conducts when rectifier 32 conducts, recharging capacitor 38. When the voltage at intermediate tap A rises to the point that the voltage between G and B exceeds the voltage in output capacitor 30, recharging takes place, raising the voltage in capacitor 30. Similarly when the voltage at tap D rises to the point that the voltage between G and E exceeds the voltage across capacitor 30, recharging again occurs, providing four recharges per cycle.

Figure 6:
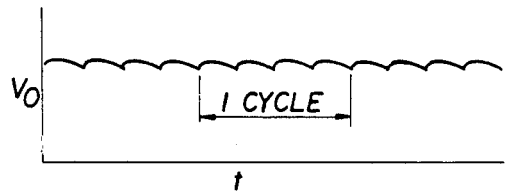
FIG. 6 is a representation of the output of the power supply of the present invention, showing the ripple component thereof.

The output voltage Vo is shown in FIG. 6. It is seen that the waveform has generally the same shape as the output of a full wave rectifier, but there are four charging episodes of the output capacitor 30 per cycle instead of two, and the magnitude of the ripple component is substantially reduced.

There thus has been described a power supply circuit having a reduced ripple and improved efficiency.

Further, it should be noted that while the invention has been described in connection with an illustrative embodiment, variations will occur to those skilled in the art, and the scope of the invention is to be limited only by the claims appended hereto and equivalents.

I claim:

1. A power supply which results in a low output voltage ripple, comprising,
   a transformer which is center-tapped and has one intermediate tap within each transformer half,
   rectifier means connected to the output of the transformer, said rectifier means including at least one diode and an output capacitor, and
   circuit means connected between the intermediate taps and the output capacitor for increasing the frequency at which the output capacitor is charged.

2. A power supply which results in a low output voltage ripple, comprising,
   a transformer,
   full wave rectifier means connected to the output of the transformer which includes at least two diodes and an output capacitor, wherein the transformer is center-tapped and has one intermediate tap within each transformer half,
   circuit means connected between said intermediate taps and said output capacitor for increasing the frequency at which the output capacitor is charged.

3. The power supply of claim 2 wherein said circuit means connected between each intermediate tap and the output capacitor includes a second capacitor.

4. The power supply of claim 3 wherein said circuit means connected between each intermediate tap and the output capacitor includes at least one diode.

5. The power supply of claim 4 wherein each second capacitor is connected between one of said intermediate taps and the connection point between first and second diodes, said first diode being connected between said second capacitor and one side of said output capacitor and the second diode being connected with opposing polarity to said first diode between said second capacitor and the other side of said output capacitor.

6. The power supply of claim 2 wherein the location of said intermediate taps is adjusted to provide optimum recharge pattern.

7. The power supply of claim 5 wherein the location of said intermediate taps is adjusted to provide optimum recharge pattern.

* * * * *